(12) United States Patent
D'Sa et al.

(10) Patent No.: US 6,374,350 B1
(45) Date of Patent: Apr. 16, 2002

(54) SYSTEM AND METHOD OF MAINTAINING AND UTILIZING MULTIPLE RETURN STACK BUFFERS

(75) Inventors: Reynold V. D'Sa, Portland; Rebecca E. Hebda, Sherwood; Stavros Kalafatis, Portland; Alan B. Kyker, Davis; Robert B. Chaput, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/584,890

(22) Filed: Jun. 1, 2000

Related U.S. Application Data

(63) Continuation of application No. 09/027,407, filed on Feb. 20, 1998, now Pat. No. 6,151,671.

(51) Int. Cl.[7] .................................................. G06F 9/42
(52) U.S. Cl. ........................ 712/239; 712/202; 712/238
(58) Field of Search ................................ 712/239, 202, 712/238

(56) References Cited

U.S. PATENT DOCUMENTS

| | | | |
|---|---|---|---|
| 3,938,103 A | 2/1976 | Welin | |
| 5,101,341 A | * 3/1992 | Circello et al. | ............. 712/213 |
| 5,319,757 A | 6/1994 | Moore et al. | |
| 5,381,533 A | 1/1995 | Peleg et al. | |
| 5,526,498 A | 6/1996 | Matsuo et al. | |
| 5,574,871 A | 11/1996 | Hoyt et al. | |
| 5,577,217 A | 11/1996 | Hoyt et al. | |
| 5,584,001 A | 12/1996 | Hoyt et al. | |
| 5,604,877 A | 2/1997 | Hoyt et al. | |
| 5,765,007 A | 6/1998 | Rahman et al. | |
| 5,768,576 A | 6/1998 | Hoyt et al. | |
| 5,850,543 A | 12/1998 | Shiell et al. | |
| 5,964,868 A | * 8/1999 | Gochman et al. | ........... 712/234 |

* cited by examiner

*Primary Examiner*—David Hudspeth
*Assistant Examiner*—Gautam R. Patel
(74) *Attorney, Agent, or Firm*—Kenyon & Kenyon

(57) ABSTRACT

An instruction pipeline in a microprocessor is provided. The instruction pipeline includes a plurality of pipeline units, each of the plurality of pipeline units processing a plurality of instructions. At least two of the plurality of pipeline units are a source of at least some of the instructions for the pipeline. The pipeline further includes at least two speculative return address stacks, each of the speculative return address stacks coupled is coupled to at least one of the instruction source units. Each of the speculative return address stacks are capable of storing at least two speculative return addresses.

16 Claims, 8 Drawing Sheets

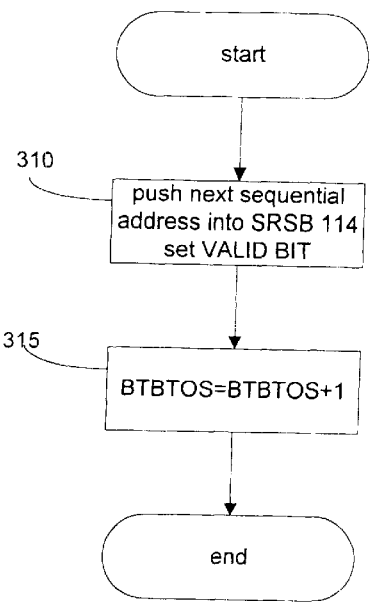
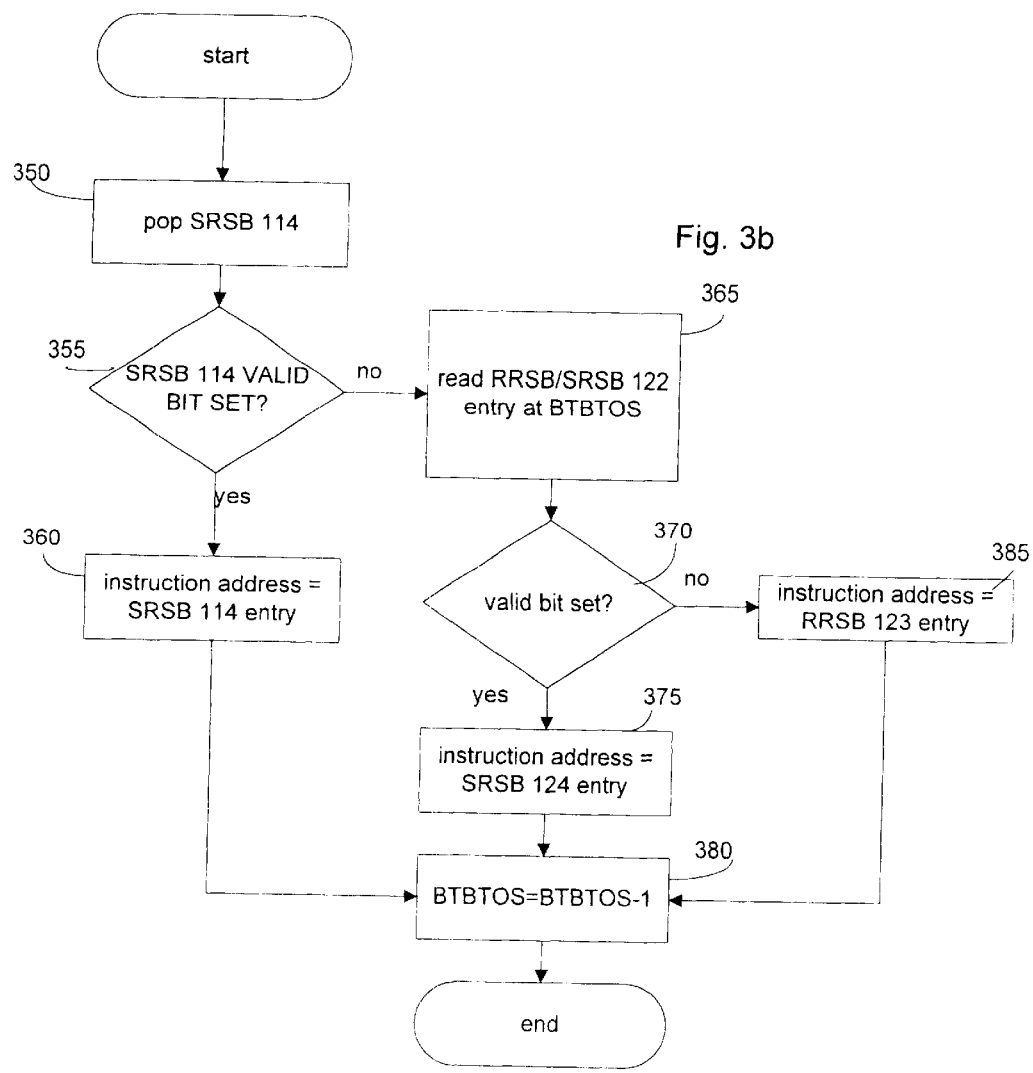
Fig. 3a
Fig. 3b

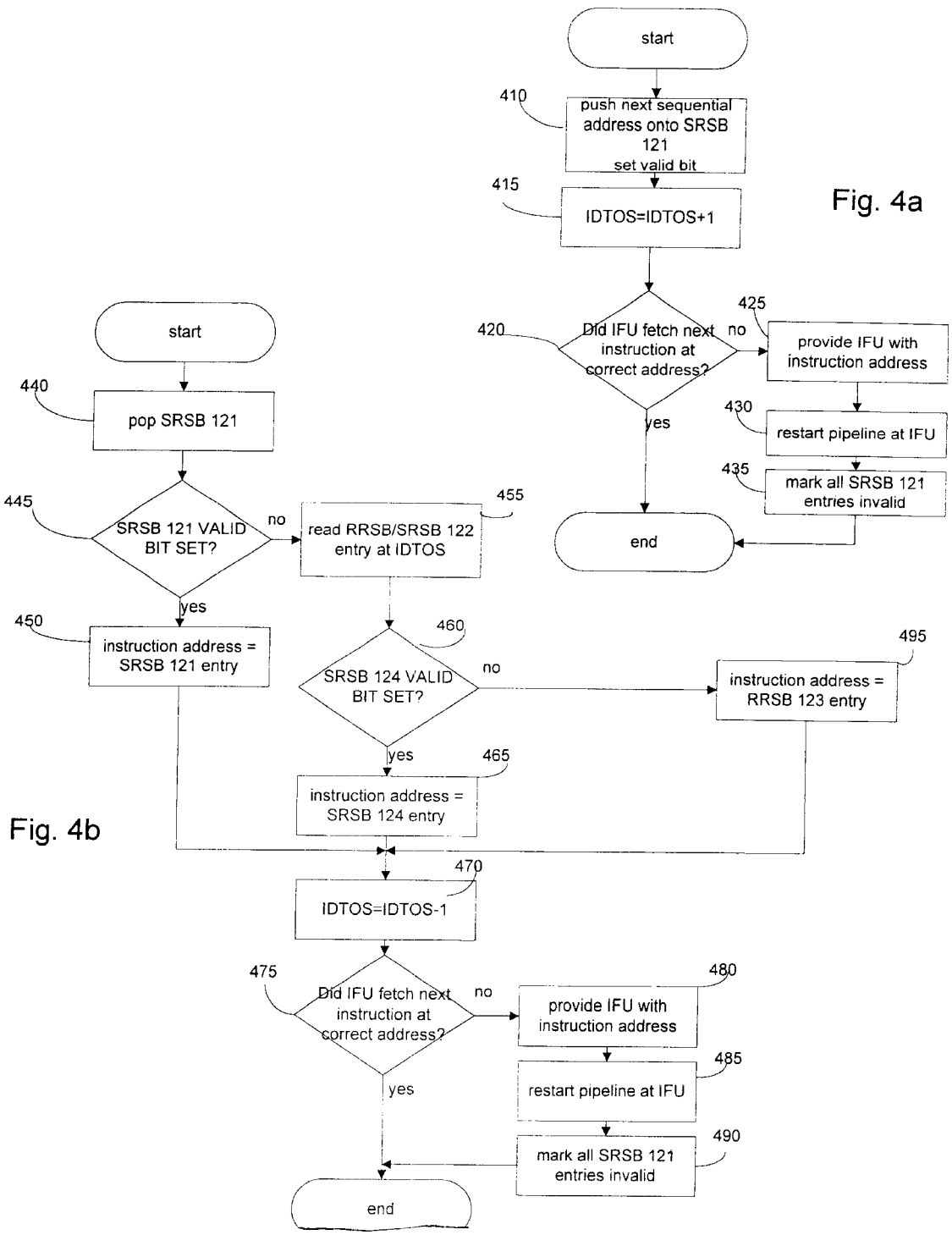

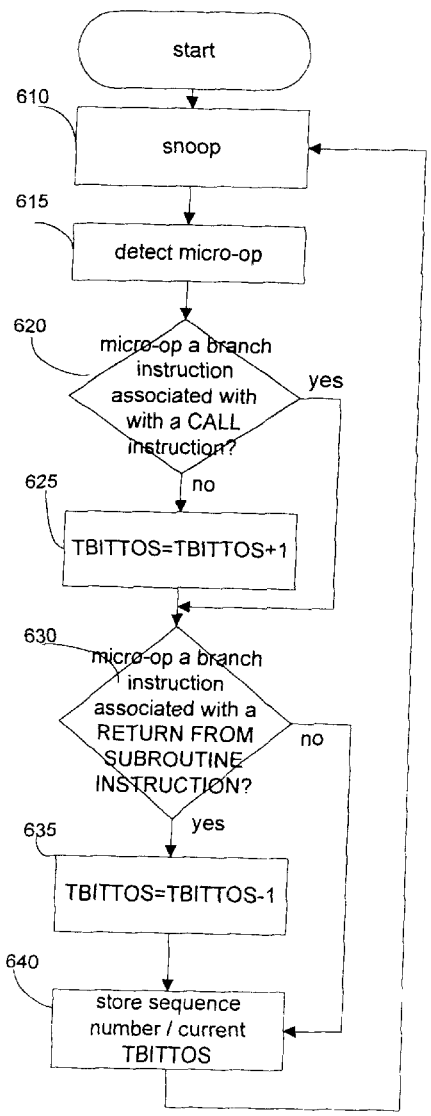
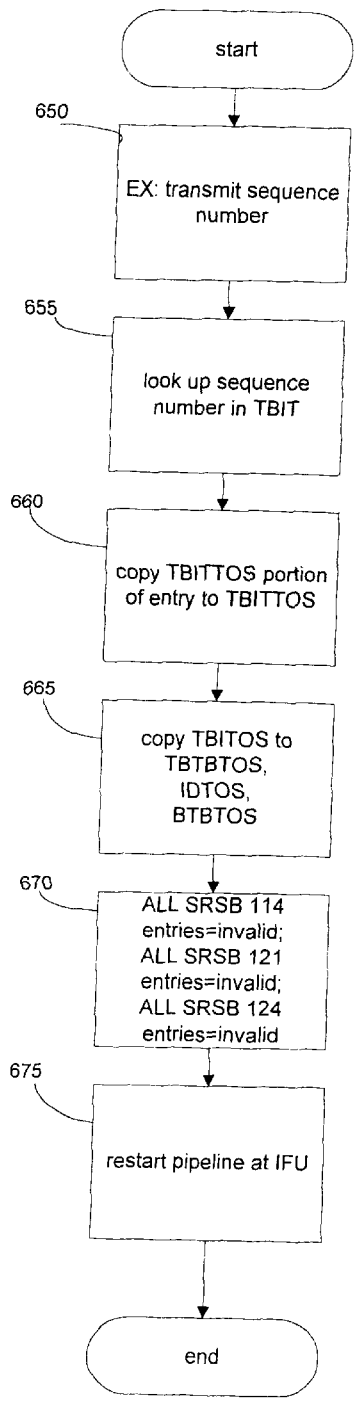
Fig. 6a
Fig. 6b

SYSTEM AND METHOD OF MAINTAINING AND UTILIZING MULTIPLE RETURN STACK BUFFERS

This Application is a Continuation of Ser. No. 09/027,407 filed Feb. 20, 1988 Now U.S. Pat. No. 6,151,671.

FIELD OF THE INVENTION

The present invention is directed to improvements to an instruction pipeline in a microprocessor. In particular, the present invention is directed to the maintenance and utilization of information related to RETURN FROM SUBROUTINE instructions.

BACKGROUND INFORMATION

Modem microprocessors include instruction pipelines in order to increase program execution speeds. Instruction pipelines typically include a number of units, each unit operating in cooperation with other units in the pipeline. One exemplary pipeline, found in, for example, Intel's Pentium® Pro microprocessor, includes an instruction fetch unit (IFU), an instruction decode unit (ID), an allocation unit (ALLOC), an instruction execution unit (EX) and a write back unit (WB). The instruction fetch unit fetches program instructions, the instruction decode unit translates the instructions into micro-ops, the allocation unit assigns a sequence number to each micro-op, the execution unit executes the micro-ops, and the write back unit retires instructions.

In this exemplary pipeline arrangement, the instruction fetch unit fetches instructions, while the other units operate on previously fetched instructions. In order for a pipelined microprocessor to operate efficiently, the instruction fetch unit continually provides the pipeline with a stream of instructions.

Certain types of instructions may cause the instruction fetch unit to stall until a unit further downstream in the pipeline fully resolves the instruction. For example, it is not known whether a conditional branch instruction will be taken or not taken until the branch condition is fully resolved. Accordingly, after the instruction fetch unit fetches such a conditional branch instruction, the instruction fetch unit does not know whether the next required instruction is the next sequential program instruction, or the instruction at the branch target address of the conditional branch instruction. If the instruction fetch unit were required to wait until the branch condition is fully resolved, i.e., after the instruction is executed, the instruction fetch unit would stall. Accordingly, modern microprocessor instruction pipelines include prediction circuitry for predicting whether or not such a branch instruction will be taken.

In Intel's Pentium® Pro microprocessor, for example, the instruction pipeline includes prediction circuitry, i.e., a branch target buffer (BTB), that predicts whether or not a branch instruction will be taken or not taken based on the history of the branch instruction. Exemplary embodiments of the branch target buffer are described in detail in U.S. Pat. No. 5,574,871 to Hoyt et al., U.S. Pat. No. 5,577,217 to Hoyt et al., U.S. Pat. No. 5,584,001 to Hoyt et al.

Certain types of branch instructions are associated with program calls to subroutines. A typical program calls a subroutine by issuing a CALL instruction, explicitly citing the address of the subroutine to which the program should branch. The subroutine then typically ends with a RETURN FROM SUBROUTINE instruction, which causes the program to branch back to the program that made the call. This return address is not explicitly cited. However, when the CALL instruction associated with the RETURN FROM SUBROUTINE instruction is executed, the address of the next sequential instruction (relative to the CALL instruction) is pushed onto a branch prediction stack, i.e., a real return stack buffer (RRSB). When the RETURN FROM SUBROUTINE instruction is retired, the RRSB is "popped" (e.g., removing the top entry from the stack, or invalidating the entry from the stack and incrementing a pointer), thereby providing the processor, and the instruction fetch unit in particular, with the appropriate return address.

Because an instruction pipeline is typically several instructions deep, it is possible that the instruction fetch unit will need the return address in order to fetch the next instruction before the CALL instruction is actually executed and retired, particularly in the case of a short subroutine. For example, if a subroutine is only 10 instruction long, but the instruction pipeline is 20 instructions deep, the instruction fetch unit will need the return address before the CALL instruction even gets to the execution unit and write back unit. Accordingly, a processor may include a "speculative" return stack buffer (SRSB). In the Intel Pentium® Pro processor, for example, the instruction decode unit maintains a speculative return stack buffer into which a return address for each CALL instruction the instruction decode unit detects is pushed. This return stack buffer is considered "speculative" because it may include return addresses for CALL instructions that are actually never executed. For example, if the CALL instruction in within a program path following a conditional branch instruction upon which the branch target buffer predicts branch direction, i.e., taken or not taken, the CALL instruction may never actually be executed if the branch direction of the conditional branch instruction was incorrectly predicted. A detailed description of an exemplary real return stack buffer and speculative return stack buffer are provided in U.S. Pat. No. 5,604,877 to Hoyt et al. In such a system, if a conditional branch instruction is incorrectly predicted, the pipeline must be restarted at the instruction fetch unit. That is, the instructions in the instruction pipeline following the branch instruction must be flushed, including intervening CALL and RETURN FROM SUBROUTINE instructions. Additionally, the instruction fetch unit must begin fetching instructions at the proper instruction address. Thus, the entries in the speculative return stack buffer are incorrect, and are marked invalid.

In the Intel Pentium® With MMX™ Technology microprocessor, the real return stack buffer and the speculative return stack buffer are maintained in the same structure. Thus, if the entires in the speculative return stack buffers are marked invalid, units in the instruction pipeline may instead use the entries in the real return stack buffer.

The above-described systems work reasonably well in a instruction pipeline having a single pipeline restart point, and a single instruction source (i.e., the instruction fetch unit). However, in a system that includes multiple restart points and multiple instruction sources, modifications are needed to provide the instruction fetch unit with current and reasonably accurate information.

SUMMARY OF THE INVENTION

In an exemplary embodiment of the present invention, an instruction pipeline in a microprocessor is provided. The instruction pipeline includes a plurality of pipeline units, each of the plurality of pipeline units processing a plurality of instructions. At least two of the plurality of pipeline units are a source of at least some of the instructions for the pipeline. The pipeline further includes at least two speculative return address stacks, each of the speculative return address stacks coupled is coupled to at least one of the instruction source units. Each of the speculative return return address stacks are capable of storing at least two speculative return addresses.

BRIEF DESCRIPTION OF THE DRAWINGS

FIG. 3a is a flowchart of a process performed by the instruction fetch unit upon detecting a CALL instruction in accordance with the exemplary embodiment of the present invention.

FIG. 3b is a flowchart of a process performed by the instruction fetch unit upon detecting a RETURN FROM SUBROUTINE instruction in accordance with the exemplary embodiment of the present invention.

FIG. 4a is a flowchart of a process performed by the instruction decode unit upon detecting a CALL instruction in accordance with the exemplary embodiment of the present invention.

FIG. 4b is a flowchart of a process performed by the instruction decode unit upon detecting a RETURN FROM SUBROUTINE instruction in accordance with the exemplary embodiment of the present invention.

FIG. 6a is a flowchart of a process performed by trace branch information table circuitry in maintaining pointers for an out-of-order portion of the microprocessor in accordance with the exemplary embodiment of the present invention.

FIG. 6b is a flowchart of a process for recovering from a branch misprediction performed in the exemplary pipeline.

DETAILED DESCRIPTION
Overall System Architecture

Figure 1A:
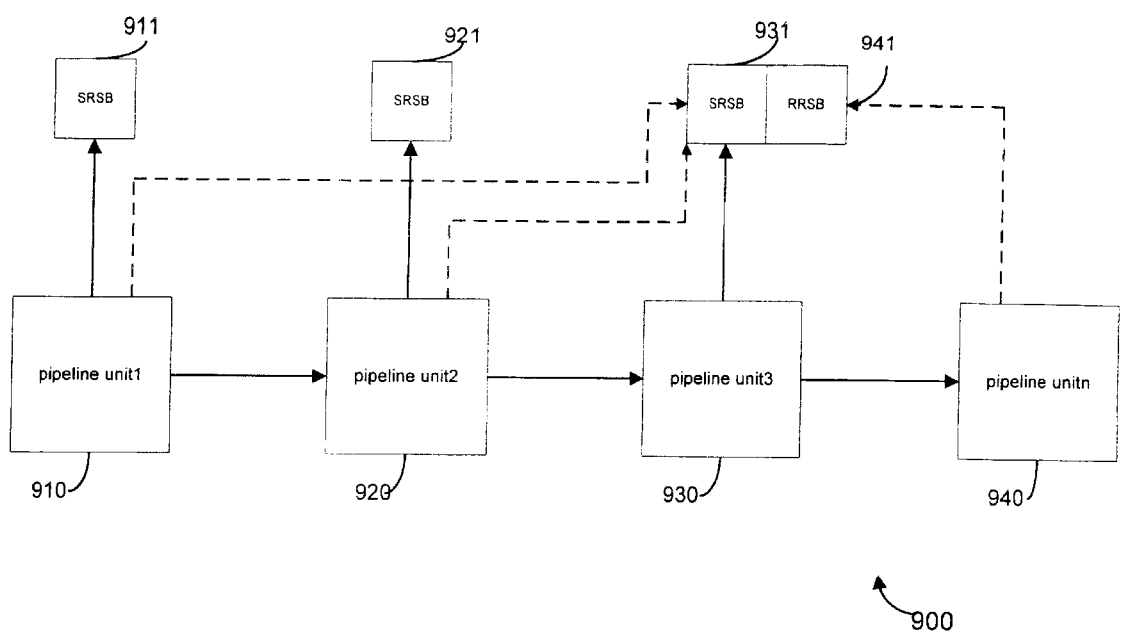
FIG. 1a is a block diagram of the overall system architecture of a first embodiment of the present invention.

Referring now to the drawings, and initially to FIG. 1a, there is illustrated the overall system architecture of the present invention. As shown, instruction pipeline 900 includes a plurality of pipeline units, i.e., pipeline unit1 910, pipeline unit2 920, pipeline unit3 930 and pipeline unitn 940. Although four pipeline units are illustrated, the instruction pipeline 900 may include more or less units. Additionally, although the pipeline units of pipeline 900 are illustrated as coupled in series, alternative connections are possible. For example, pipeline unit3 930 may be connected in parallel with another unit, such as, for example, pipeline unit2 920.

Pipeline unit1 910 may be, for example, an instruction source for pipeline 900. That is, pipeline unit1 910 may fetch instructions from, for example, main memory, cache memory, etc., and provide the fetched instructions to the instruction pipeline 900 for processing. In the embodiment illustrated, each pipeline unit processes instructions received from an upstream pipeline unit, and then passes the processed instructions to the next downstream unit. For example, pipeline unit2 920 may receive instructions from pipeline unit1 910, and may decode the received instructions. The decoded instructions may then be passed to pipeline unit3 930. (Of course, in some processors, instructions do not require decoding. In such a processor, the instruction pipeline 900 would not need a decode unit.)

In accordance with the present invention, a second instruction source may be included in pipeline 900. For example, pipeline unit3 930 may fetch instructions from, for example, main memory, cache memory, etc., and provide instructions to pipeline 900. In such a system, pipeline unit3 930 may provide instructions to pipeline 900 during a time that pipeline unit1 910 is not providing instructions to pipeline 900. That is, typically, only one pipeline unit provides instructions to pipeline 900 at any given time (although in particular architectures, it may be possible that multiple units provide instructions to pipeline 900 simultaneously).

Instruction pipeline 100 also includes an instruction execution unit. For example, pipeline unitn 940 may receive instructions from an upstream pipeline unit, and execute the instructions, either in the order received, or in an out-of-order sequence (depending on, for example, the particular architecture of the processor.)

Pipeline 900 processes instructions including, for example, subroutine call instructions. As noted above, a typical program calls a subroutine by issuing a CALL instruction. The called subroutine then typically ends with a RETURN FROM SUBROUTINE instruction. In the exemplary embodiment of the present invention, several units of pipeline 900 may each maintain a respective speculative return stack buffer into which return addresses may be pushed. In the exemplary pipeline illustrated in FIG. 1a, three speculative return stack buffers are maintained, i.e., speculative return stack buffer 911 (maintained by pipeline unit1 910), speculative return stack buffer 921 (maintained by pipeline unit2 920), and speculative return buffer 931 (maintained by pipeline unit3 930). (In alternate embodiments, however, pipeline 900 may include more or less speculative return stack buffers.) As each of pipeline unit1 910, pipeline unit2 920 and pipeline unit3 930 processes or detects a CALL instruction, it pushes a return address (e.g., the address of the next sequential instruction) onto its respective speculative return stack buffer. As each of pipeline unit1 910, pipeline unit2 920 and pipeline unit3 930 processes or detects a RETURN FROM SUBROUTINE instruction, it pops a return address from its respective speculative return stack buffer. If the pipeline unit is an instruction source (i.e., it provides instructions to pipeline 900), the pipeline unit utilizes the popped return address to determine which instruction should be provided next. If the pipeline unit is not an instruction source (or is not currently acting in the capacity of an instruction source), the pipeline unit may, for example, either not use the popped return address, or may provide the popped return address to an upstream unit if the upstream unit failed to detect the RETURN FROM SUBROUTINE instruction.

In the exemplary embodiment, each of the speculative return stack buffers may have, for example, a depth greater than one. The precise depth of each speculative return stack buffer may be depend on, for example, the depth of pipeline 900 between each of the pipeline units.

A "real" return stack buffer may also be maintained by one or more pipeline units. As illustrated in FIG. 1a, for example, a real return stack buffer 941 is maintained at pipeline unit3 930. In this embodiment, pipeline unitn 940 pushes return addresses onto real return stack buffer 941 after, for example, CALL instructions are executed and/or committed to a register set or memory of the processor. For example, in a processor where instructions are executed in-order, pipeline unitn 940 may push a return address onto real return stack buffer 941 after a CALL instruction is executed. In a processor where instructions are executed out-of-order, pipeline unitn 940 may push a return address onto real return stack buffer 941 after a CALL instruction is fully committed to the processor (e.g., committed to the processor's register set or memory) Similarly, pipeline unitn 940 pops return addresses from real return stack buffer 941 after, for example, RETURN FROM SUBROUTINE instructions are executed and/or committed to a register set or memory of the processor.

In this exemplary embodiment, real return stack buffer 941 is maintained in the same structure as speculative return stack buffer 931. The real return stack buffer 941 and speculative return stack buffer 931 may thus be indexed together or independently.

Other pipeline units within pipeline 900 may maintain a pointer to the speculative return stack buffer 931 and real return stack buffer 941 structure. Such a pointer may be useful, for example, if a pipeline unit detects that its local speculative return stack buffer may contain invalid information. In such a case, the pipeline unit may then utilize the return address at the pointer address. In particular, the pipeline unit may utilize the return address in either the speculative return stack buffer 931 or the real return stack buffer 941, instead of the return address in its own local speculative return stack buffer.

Overview of an Additional Exemplary Embodiment

Figure 1B:
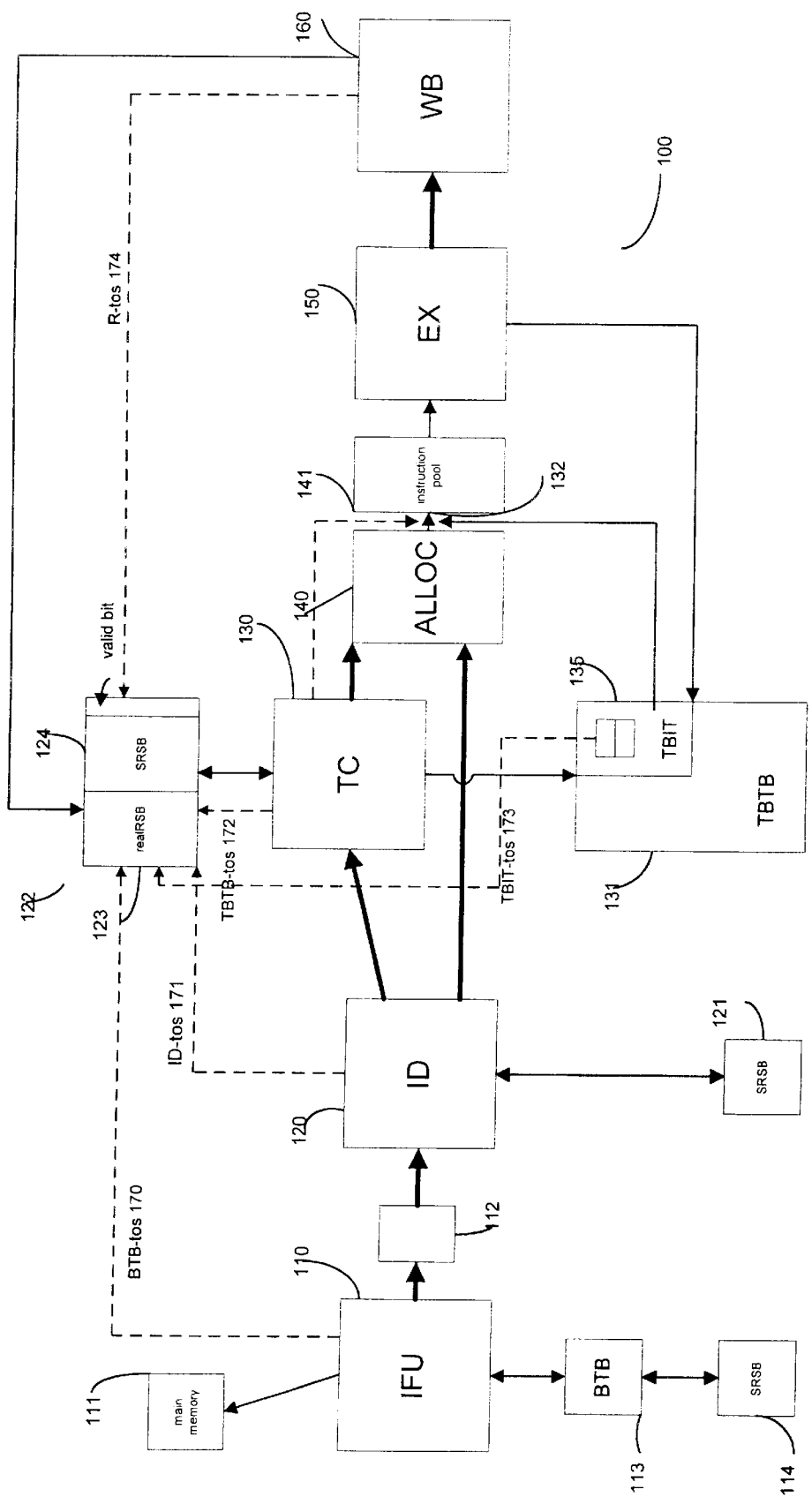
FIG. 1b is a block diagram of the overall system architecture of an exemplary embodiment of the present invention.

FIG. 1b illustrates an additional exemplary embodiment of the present invention. This embodiment illustrates the present invention as applied to, for example, an instruction pipeline for processing Intel Architecture (i.e., x86) instructions (e.g., IA-32). As a person of ordinary skill in the art will understand, however, the present invention may be applied to instruction pipelines of other processor architectures, such as, for example, RISC and CISC architectures, or any processor architecture that includes the use of an instruction pipeline.

Instruction pipeline 100 may include, for example, six major stages or units (each of the pipeline stages or units may actually be comprised of a number sub-stages), including an instruction fetch unit (IFU) 110, an instruction decode unit (ID) 120, a trace cache unit (TC) 130, an allocation unit (ALLOC) 140, an execution unit (EX) 150, and a write-back unit (WB) 160.

In this exemplary embodiment of the present invention, instruction fetch unit 110 is a source of program instructions for instruction pipeline 100. In particular, instruction fetch unit 110 fetches, for example, macro-code instructions from main memory 111 in strict program order in order to provide pipeline 100 with a stream of instructions. When a branch instruction is detected, branch prediction logic at instruction fetch unit 110, in particular, a branch target buffer (BTB) 113 makes a dynamic prediction as to whether or not the branch will be taken or not taken when the branch is eventually executed. (Branch target buffer 113 makes a branch prediction for every macro-code branch instruction it recognizes). If branch target buffer 113 predicts that the branch will not be taken, instruction fetch unit 110 continues to fetch instructions sequentially. If branch target buffer 113 instead predicts that a branch will be taken, branch target buffer 113 instructs instruction fetch unit 110 to fetch instructions starting from the branch target address. In this manner, instruction fetch unit 110 does not have to wait for any conditions on the branch to be fully resolved before it fetches further instructions. In the exemplary embodiment, if branch target buffer 113 does not recognize that a particular instruction is a branch instruction (even though it is, in fact, a branch instruction), it will not make a branch prediction, and instruction fetch unit 110 continues fetching instructions sequentially.

Instruction fetch unit 110 pushes each fetched instruction into pipeline 100. If the fetched instruction is a branch instruction (and branch target buffer 113 recognizes the instruction as such), instruction fetch unit 110 also pushes into pipeline 100 a branch prediction bit indicating whether the branch was taken or not taken by instruction fetch unit 110.

The instructions and data pushed into pipeline 100 may be temporarily stored in a series of latches 112 between instruction fetch unit 110 and the next pipeline unit. The number of latches 112 may correspond to, for example, the depth of pipeline 100 between instruction fetch unit 110 and another pipeline unit pipeline 100.

Instruction decode unit 120 receives the fetched macro-code instructions from instruction fetch unit 110 via latches 112, and processes the macro-code instructions in first-in, first-out (FIFO) order, instruction decode unit 120 decodes the macro-code instructions into, for example, fixed-length RISC instructions called micro-ops or uops. Each macro-code instruction may decode to one or a number of micro-ops. These micro-ops are assigned sequence numbers by allocation unit 140, and are temporarily stored in an instruction pool 141.

In the exemplary embodiment of the present invention, instruction pipeline 100 includes a second source of program instructions. In particular, trace cache unit 130 stores instruction sequences, in the form of micro-ops, in high speed cache memory in order to later provide these instructions to allocation unit 140 for execution by execution unit 150.

In accordance with the exemplary embodiment of the present invention, trace cache unit 130 builds and stores instruction "trace segments" in cache memory. These instruction trace segments are built while instruction fetch unit 110 is acting as the instruction source (i.e., while trace cache unit 130 is in "build" mode). In particular, for certain instruction sequences, trace cache unit 130 builds and stores (as micro-ops) sequences of macro-code instructions which may be accessed as a unit. If the sequence includes a branch instruction, only instructions along the predicted instruction path (as predicted by branch target buffer 113) are stored (i.e., as a trace segments). Additionally, trace cache unit 130 stores the branch prediction (as identified by the prediction bit accompanying the branch instruction). The structure and operation of trace cache unit 130 is described in further detail in U.S. Pat. No. 5,381,533 to Peleg et al.

Trace cache 130 controls whether the source for instructions entering instruction pool 141 is instruction fetch unit 110 (via instruction decode unit 120) or trace cache unit 130. In particular, trace cache unit 130 continuously snoops the instruction path 132 (between allocation unit 140 and instruction pool 141). If trace cache unit 130 recognizes that an instruction originating from instruction fetch unit 110 corresponds to the first instruction in an instruction trace segment (a "trace head"), i.e., a trace cache hit, trace cache unit 130 signals instruction fetch unit 110 to discontinue fetching instructions, trace cache unit 130 then provides the appropriate instructions to allocation unit 140 from its cache memory, i.e., trace cache unit 130 enters a "streaming" mode. When trace cache unit 130 detects that further necessary instructions are not in cache (i.e., a trace cache miss), trace cache unit 130 instructs instruction fetch unit 110 to recommence fetching instructions (at an address provided by trace cache unit 130), and trace cache unit 130 discontinues providing instructions to allocation unit 140.

Like instruction fetch unit 110, trace cache unit 130 includes branch prediction circuitry, trace branch target buffer 131. If a trace segment includes a branch instruction, trace branch target buffer 131 dynamically predicts "trace leave" conditions. In particular, as trace cache unit 130 provides trace instructions to allocation unit 140, trace branch target buffer 131 performs its own dynamic prediction as to whether the branch instructions in the trace will be taken or not taken. The structure and operation of trace cache unit is described in further detail in U.S. Pat. No. 5,381,533 to Peleg et al.

In the exemplary embodiment of the present invention, execution unit 150 obtains instructions from the instruction pool 141. Execution unit 150 executes the micro-ops in the instruction pool 141 in any order possible as data and execution units required for each micro-op becomes available. Accordingly, execution unit 150 is an out-of-order (OOO) portion of the pipeline.

Finally, write back unit 160 "retires" each executed micro-op. That is, write back unit 160 commits the result of each micro-op execution to the processor's register set in the order of original program flow. Thus, write back unit 160 is an in-order rear end of the pipeline.

CALL Instructions

A CALL instruction is a special type of branch instruction. Specifically, a CALL, instruction is a branch to a subroutine. It is generally expected that the called subroutine will include a RETURN FROM SUBROUTINE instruction, which is a branch to the instruction immediately following the CALL instruction in the calling program.

In accordance with the exemplary embodiment of the present invention, instruction pipeline 100 includes several features for enabling units within pipeline 100 to predict the return address for a RETURN FROM SUBROUTINE instruction. Three speculative return stack buffers, i.e., speculative return stack buffer 114, speculative return stack buffer 121 and speculative return stack buffer 124 are maintained at instruction fetch unit 100 (branch target buffer 113), instruction decode unit 120 and trace cache unit 130, respectively. Additionally, one "real" return stack buffer, real return stack buffer 123, is maintained in the same structure as speculative return stack buffer 124 (collectively, real return stack buffer/speculative return stack buffer 122). Also, several of the units within instruction pipeline 100, i.e., instruction fetch unit 110, instruction decode unit 120, trace cache unit 130, and write back unit 160 maintain a pointer into real return stack buffer/speculative return stack buffer 122, namely, BTB-top of stack pointer 170, ID-top of stack pointer 171, TBTB-top of stack pointer 172 and R-top of stack pointer 174, respectively.

Additionally, circuitry associated with trace branch target buffer 131, namely trace branch information circuitry (TBIT) 135, maintains in a table a pointer into real return stack buffer/speculative return stack buffer 122, TBIT-top of stack pointer, in various states. The information stored in this table may be used to recover from a branch misprediction in a pipeline, such as, for example, pipeline 100, where the execution unit executes instructions in an out-of-order sequence.

Table 1 (below) summarizes the exemplary features in pipeline 100 for predicting return addresses.

TABLE 1

| feature | exemplary purpose |
| --- | --- |
| speculative return stack buffer 114 | speculative return address stack maintained by instruction fetch unit 110 |
| speculative return stack buffer 121 | speculative return address stack maintained by instruction decode unit 120 |
| real return stack buffer 123 | real return address stack maintained by write back unit 160 |
| speculative return stack buffer 124 | speculative return address stack maintained by trace cache unit 130 |
| real return stack buffer/ speculative return stack buffer 122 | combination of two stacks, real return stack buffer 123 and speculative return stack buffer 124 |
| BTB-top of stack pointer 170 | top of stack pointer to real return stack buffer/speculative return stack buffer 122 maintained by instruction fetch unit 110 |
| ID-top of stack pointer 171 | top of stack pointer to real return stack buffer/speculative return stack buffer 122 maintained by instruction decode unit 120 |
| TBTB-top of stack pointer 172 | top of stack pointer to real return stack buffer/speculative return stack buffer 122 maintained by trace cache unit 172 |
| TBIT-top of stack pointer 173 | top of stack pointer to real return stack buffer/speculative return stack buffer 122 maintained by trace branch information table 132; table of TBIT-top of stack pointer 173 at various states stored in a table for recovery purposes |
| R-top of stack pointer 174 | top of stack pointer to real return stack buffer 123 maintained by write back unit 160 |

Speculative Return Stack Buffer Structure

Figure 2A:
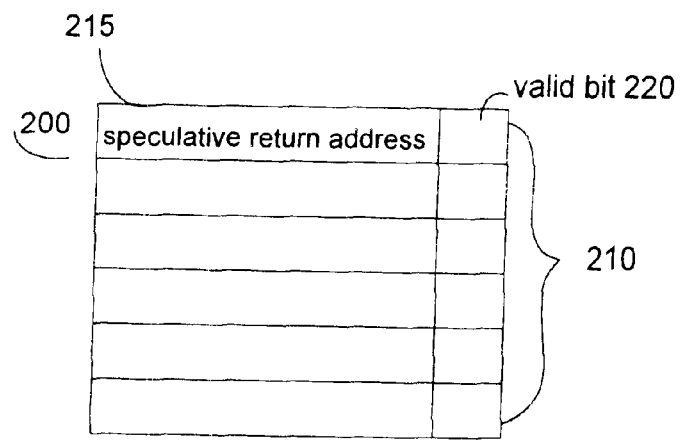
FIG. 2a is an illustration of an exemplary speculative return stack buffer.

In the exemplary embodiment, speculative return stack buffer 114, speculative return stack buffer 115 and speculative return stack buffer 124 have the same basic structure. As illustrated in FIG. 2a, speculative return stack buffer 114, speculative return stack buffer 115 and speculative return stack buffer 124 are stack structures. Each stack 200 includes a number of entries 210, the number of entries in stack 200 (i.e., the depth of stack 200) being dependent on, at least in part, the depth of pipeline 100.

Each entry 210 includes two fields: i) a speculative return address field 215 (which, as the name implies, contains a speculative return address), and ii) a VALID BIT 220, which indicates whether or not the entry is valid. New entries are added to stack 200 with a "push" operation, which places the new entry at the top of the stack 200. An entry is removed from stack 200 with a "pop" operation which removes the top entry from stack 200. The popped entry may then be utilized. An entry may also be popped just for consistency and synchronization purposes, and not be utilized at all.

RRSB/Speculative Return Stack Buffer Structure

Figure 2B:
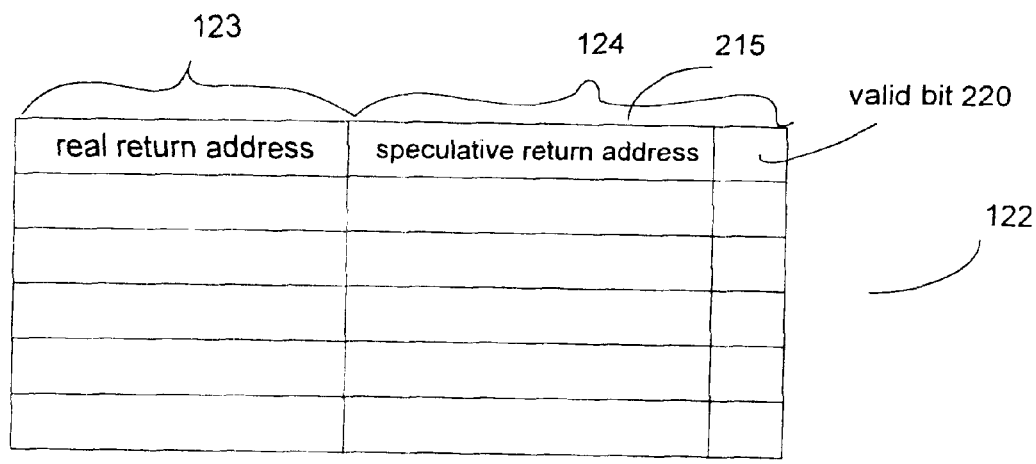
FIG. 2b is an illustration of an exemplary real return stack buffer/speculative return stack buffer.

The structure of real return stack buffer/speculative return stack buffer 122 is illustrated in FIG. 2b. Real return stack buffer/speculative return stack buffer 122 is, for example, comprised of two stacks: i) a stack including real return addresses i.e., real return stack buffer 123, and ii) speculative return stack buffer 124. Entries in the two stacks real return stack buffer 123 and speculative return stack buffer 124 may be individually pushed and popped. Additionally, each of pointers BTB-top of stack pointer 170, ID-top of stack pointer 171, TBTB-top of stack pointer 172, TBIT-top of stack pointer 173 and R-top of stack pointer 174 allow the corresponding pipeline unit (i.e., instruction fetch unit 110, instruction decode unit 120, trace cache unit 130, allocation unit 140 and write back unit 150, respectively) to read an entry in real return stack buffer/speculative return stack buffer 122, the entry including an entry from real return stack buffer 123 and an entry from speculative return stack buffer 124.

Operation

During normal operations, write back unit 150 pushes return addresses onto real return stack buffer 123 when a CALL instruction is retired, and pops return addresses from real return stack buffer 123 when a RETURN FROM SUBROUTINE instruction is retired. Write back unit 160 maintains pointer R-top of stack pointer 174 to point to the current top of real return stack buffer 123. Since these addresses are pushed and popped at instruction retirement time, these return addresses are referred to as "real" return addresses.

There may be a time lag between when instruction fetch unit 110 or another unit in pipeline 100 needs a return address, and when the return address is actually pushed onto real return stack buffer 123. For example, instruction fetch unit 110 may see both a CALL instruction and a corresponding RETURN FROM SUBROUTINE instruction before the return address is pushed onto real return stack buffer 123 by write back unit 160. This might occur when a subroutine is very short, and/or when pipeline 100 is very deep. If instruction fetch unit 110 were required to wait for the return address to be pushed onto real return stack buffer 123, instruction fetch unit 110 and thus pipeline 100 would stall.

To alleviate the afore-mentioned problem, instruction fetch unit 110 maintains speculative return stack buffer 114. For each CALL instruction, instruction fetch unit 110 pushes a speculative return address onto speculative return stack buffer 114. This address is only "speculative" since there could be, for example, a mispredicted branch instruction preceding the CALL instruction in the pipeline, in which case the corresponding CALL instruction may never actually be executed and retired.

Additionally, for each RETURN FROM SUBROUTINE instruction, instruction fetch unit 110 pops the speculative return address from speculative return stack buffer 114 and uses this address (if the address is marked valid) as the address of the next instruction to fetch.

Instruction fetch unit 110, is not the only instruction source in the exemplary instruction pipeline 100. Trace cache 130 also provides instructions to instruction pipeline 100. As described above, the source of instructions switches back and forth between instruction fetch unit 110 and trace cache unit 130. Accordingly, an additional speculative return stack buffer, namely speculative return stack buffer 124, is maintained at trace cache unit 130, with pointer TBTB-top of stack pointer 172 pointing to the top of this stack. More specifically, if trace cache unit 130 provides a CALL instruction to instruction pool 141, trace cache unit 130 pushes the corresponding return address onto the top of speculative return stack buffer 124 pointed to by TBTB-top of stack pointer 172.

Additionally, trace cache unit 130 snoops path 132 (between allocation unit 140 and the instruction pool 141). If trace cache unit 130 detects a CALL instruction on path 132, trace cache unit 130 pushes the corresponding return address onto speculative return stack buffer 124. Accordingly, speculative return stack buffer 124 includes all return addresses corresponding to CALL instructions originating from both paths.

Trace cache 130 also pops a return address from speculative return stack buffer 124 when it i) provides a RETURN FROM SUBROUTINE instruction to instruction pool 141, or ii) detects a RETURN FROM SUBROUTINE instruction on path 132 (i.e., originating from instruction fetch unit 110). The popped return address, however, is not used.

In the exemplary embodiment of the present invention, instruction decode unit 120 also maintains a speculative return stack buffer, speculative return stack buffer 121. speculative return stack buffer 121 is utilized because instruction fetch unit 110 does not recognize all CALL or RETURN FROM SUBROUTINE instructions. instruction fetch unit 110 only recognizes instructions that are stored in branch target buffer 113. Since the cache at branch target buffer 113 is of a limited size, not all instructions will be stored in branch target buffer 113. If instruction decode unit 120 detects that instruction fetch unit 110 failed to recognize a CALL instruction, or failed to properly predict a return address following a RETURN FROM SUBROUTINE instruction (i.e., the branch prediction bit was not set), instruction decode unit 120 initiates a pipeline restart and provides instruction fetch unit 110 with the proper instruction address from which to fetch the next instruction.

Additionally, each time the instruction source switches from trace cache unit 130 to instruction fetch unit 110, all of the entries in speculative return stack buffer 114 (at instruction fetch unit 110) and speculative return stack buffer 121 (at instruction decode unit 120) are marked invalid, since these stacks do not include return addresses corresponding to CALL instructions that trace cache unit 130 provided to instruction pool 141, and/or may include return addresses that have already been utilized following a RETURN FROM SUBROUTINE instruction provided by trace cache unit 130 to instruction pool 141.

If the processor detects a branch misprediction, the entries in all speculative return stack buffers, i.e., speculative return stack buffer 114, speculative return stack buffer 121 and speculative return stack buffer 124, are marked invalid. This is because instructions in pipeline 100 following the mispredicted branch instructions are along the wrong instruction path. Thus, return addresses corresponding to CALL instructions that may never be executed may be in the stacks, or return addresses may be missing or in the wrong order.

Pointers BTB-top of stack pointer 170 and ID-top of stack pointer 171 are utilized by instruction fetch unit 110 and instruction decode unit 120, respectively, to obtain a return address from real return stack buffer/speculative return stack buffer 122 if the entry at the top of speculative return stack buffer 114 or speculative return stack buffer 121 (respectively) is marked invalid.

In the exemplary embodiment, pointer TBIT-top of stack pointer 173 is maintained by trace branch information table 135 for machine state recovery purposes. In particular, trace branch information table 135 maintains a table including various states of TBIT-top of stack pointer 173 in order to provide a means to synchronize the pointers to real return stack buffer/speculative return stack buffer 122 in the event of a branch misprediction. For example, execution unit 150 may detect a branch misprediction. However, since execution unit 150 processes instructions in an out-of-order sequence, a special mechanism is required to enable correction of the pointers into real return stack buffer/speculative return stack buffer 122 after a mispredicted branch is detected. Thus, in the exemplary embodiment of the present invention, trace branch information table 135 circuitry is utilized. In particular, trace branch information table 135 detects micro-ops along path 132. For each micro-op detected, trace branch information table 135 stores in a table entry the sequence number of the micro-op, as well as the current state of TBIT-top of stack pointer 173. Then, if a branch misprediction is detected by execution unit 150, the appropriate TBIT-top of stack pointer 173 value may be retrieved from the table at trace branch information table 135 using the sequence number of the mispredicted branch instruction, in order to restore all other pointers to the appropriate top of real return stack buffer/speculative return stack buffer 122.

The maintenance and use of each of the return stack buffers is described in further detail below in connection with the flowcharts of FIGS. 3a–7b (elements identified with a reference number in the 100-series are illustrated in FIG. 1b).

FIG. 3a is a flowchart of a process performed by instruction fetch unit 110 upon fetching (and recognizing) a CALL instruction. In accordance with the exemplary embodiment of the present invention, upon detecting the CALL instruction, instruction fetch unit 110 pushes the next sequential address (i.e., the address of the instruction immediately following the CALL instruction) onto speculative return stack buffer 114 and sets the VALID BIT (step 310). Additionally, instruction fetch unit 110 increments BTB-top of stack pointer 170 (instruction fetch unit 110's pointer into real return stack buffer/speculative return stack buffer 122) (step 315).

Upon fetching (and recognizing) a RETURN FROM SUBROUTINE instruction, instruction fetch unit 110 performs the process illustrated in the flowchart of FIG. 3a. Instruction fetch unit 110 first pops speculative return stack buffer 114 to obtain the current top of stack entry (step 350). If the VALID BIT in that particular entry is set (step 355), instruction fetch unit 110 uses the speculative return address in the popped entry as the address of the next instruction to be fetched(step 360).

If the VALID BIT in the stack entry popped from speculative return stack buffer 114 is not set (thus indicating that the entry is invalid), instruction fetch unit 110 reads the entry in real return stack buffer/speculative return stack buffer 122 pointed to by BTB-top of stack pointer 170 (step 365). If the VALID BIT in the entry read from real return stack buffer/speculative return stack buffer 122 is set (step 370), instruction fetch unit 110 uses the speculative return address in that entry (i.e., the portion of the entry contributed by speculative return stack buffer 124) as the address of the next instruction to be fetched (step 375). If the VALID BIT in that entry is not set, the real return address in that entry (i.e., the portion of the entry contributed by real return stack buffer 124) is instead utilized (step 385).

After the next fetch address is determined, BTB-top of stack pointer 170 is decremented (step 380).

The flowcharts of FIGS. 4a and 4b illustrate processes performed by instruction decode unit 120 in accordance with the exemplary embodiment of the present invention, upon detection of a CALL instruction and a RETURN FROM SUBROUTINE instruction, respectively.

Referring first to FIG. 4a, upon receiving a CALL instruction from instruction fetch unit 110 (via latches 112), instruction decode unit 120 pushes the next sequential address onto speculative return stack buffer 121 and sets the VALID BIT(step 410). ID-top of stack pointer 171 is then incremented (step 415). Next, instruction decode unit 120 determines whether or not instruction fetch unit 110 had recognized the CALL instruction (step 420). This may be determined by testing the branch prediction bit. That is, if the branch prediction bit is set, instruction decode unit 120 recognized the CALL instruction. However, if the branch prediction bit is not set, instruction fetch unit 110 did not recognize the CALL, instruction. Accordingly, instruction fetch unit 110 is fetching instructions along the wrong program path, i.e., sequentially. In that event, instruction decode unit 120 transmits the proper target address to instruction fetch unit 110 (step 425) and initiates a pipeline restart (step 430). In particular, the pipeline between instruction fetch unit 110 and instruction decode unit 120 is flushed.

Additionally, all entries in speculative return stack buffer 114 are marked invalid (step 435). Since instruction fetch unit 110 fetched instructions along a wrong program path, the stack may include return addresses corresponding to CALL instructions that instruction fetch unit 110 should not have fetched. Additionally, instruction fetch unit 110 may have incorrectly popped an address from speculative return stack buffer 114 if instruction fetch unit 110 fetched a RETURN FROM SUBROUTINE instruction it should not have. Or, the return addresses in speculative return stack buffer 114 may now be ordered incorrectly.

Referring now to FIG. 4b, an exemplary process performed by instruction decode unit 120 upon receiving a RETURN FROM SUBROUTINE instruction from instruction fetch unit 110 (via latches 112) is illustrated in flowchart form. First, instruction decode unit 120 pops speculative return stack buffer 121 to obtain the entry at the top of the speculative stack (step 440). If the VALID BIT in this entry is set (step 445), instruction decode unit 120 sets the speculative return address in this entry as the address of the instruction it expects to obtain next from instruction fetch unit 10 (step 450).

If the VALID bit in the entry popped from speculative return stack buffer 121 is not set, instruction decode unit 120 reads the entry in real return stack buffer/speculative return stack buffer 122 pointed to by ID-top of stack pointer 171 (step 455). If the VALID BIT in the entry read is set, instruction decode unit 120 sets the speculative return address in this entry as the address of the instruction it expects to obtain next from latches 112 (step 460). Otherwise, the real return address in this entry is set as the expected address (step 495).

Next, ID-top of stack pointer 171 is decremented (step 470).

Instruction decode unit 120 then determines whether or not instruction fetch unit 110 fetched the correct instruction (step 475). As noted above, instruction fetch unit 110 does not recognize all instructions. Accordingly, instruction fetch unit 110 may have failed to push a return address onto, or pop a return address from speculative return stack buffer 114. If the prediction bit is not set, the next instruction in latches 112 is incorrect. Thus, instruction decode unit 120 provides instruction fetch unit 110 with the proper address (step 480). Additionally, instruction decode unit 120 initiates a pipeline restart (step 485). In particular, the pipeline between instruction fetch unit 110 and instruction decode unit 120 is flushed. Additionally, all entries in speculative return stack buffer 114 are marked invalid (step 490).

Figure 5A:
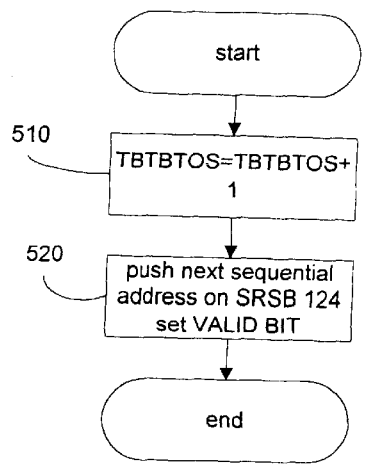
FIG. 5a is a flowchart of a process performed by the trace cache unit upon detecting a CALL instruction in accordance with the exemplary embodiment of the present invention.
Figure 5B:
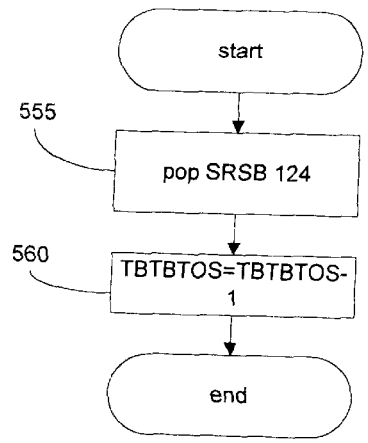
FIG. 5b is a flowchart of a process performed by the trace cache unit upon detecting a RETURN FROM SUBROUTINE instruction in accordance with the exemplary embodiment of the present invention.
Figure 5C:
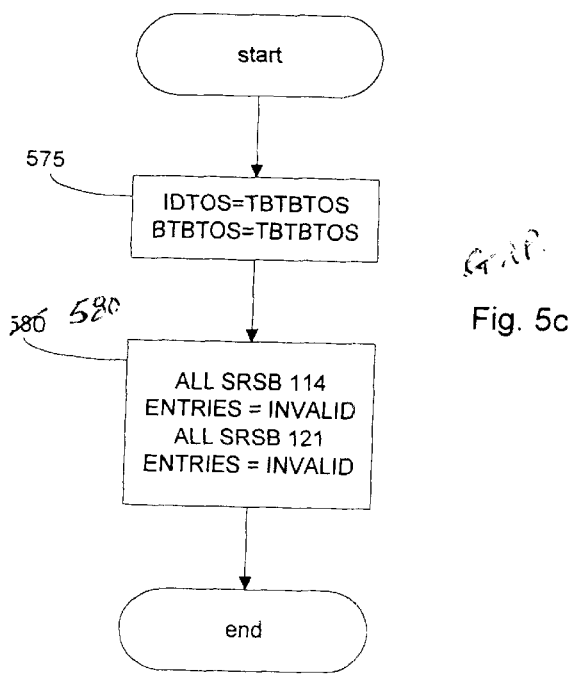
FIG. 5c is a flowchart of an exemplary process performed by units in the instruction pipeline when the instruction source become the instruction fetch unit.

FIGS. 5a, 5b and 5c show flowcharts of processes performed by trace cache unit 130 in accordance with the exemplary embodiment of the present invention. Referring to FIG. 5a, a flowchart of a process performed by trace cache unit 130 upon detecting a CALL instruction is illustrated.

Upon detecting a CALL instruction (the CALL instruction originating from trace cache unit 130 or detected along path 132 originating from instruction fetch unit 110) trace cache unit 130 increments its pointer to real return stack buffer/speculative return stack buffer 122, TBTB-top of stack pointer 172 (step 510). Trace cache unit 130 then pushes the next sequential address, i.e., the address of the instruction following the CALL instruction, onto speculative return stack buffer 124 (step 520). As illustrated in FIG. 5b, when trace cache unit 130 detects a RETURN FROM SUBROUTINE instruction (again, the instruction originating either from trace cache unit 130 or instruction fetch unit 110), trace cache unit 130 performs the steps opposite those shown in FIG. 3a. Specifically, upon detecting a RETURN FROM SUBROUTINE instruction, trace cache unit 130 pops speculative return stack buffer 124 (step 555) and decrements TBTB-top of stack pointer 172 (step 560).

As described above, pipeline 100 switches between utilizing trace cache unit 130 and utilizing instruction fetch unit 110 as the program instruction source. When instruction fetch unit 110 becomes the program instruction source, the process illustrated in the flowchart of FIG. 5c is performed. First, both ID-top of stack pointer 171 and BTB-top of stack pointer 170 are set equal to TBTB-top of stack pointer 172 (step 575). Then, all entries in speculative return stack buffer 114 and speculative return stack buffer 121 are marked invalid (step 580). In the exemplary embodiment of the present invention, these steps are performed because instruction fetch unit 110 and instruction decode unit 120 are upstream in the pipeline relative to trace cache unit 130. Therefore, during the time that trace cache unit 130 is the instruction source, neither instruction fetch unit 110 nor instruction decode unit 120 knows which instructions were transmitted to instruction pool 141 by trace cache unit 130. Accordingly, the speculative buffers at instruction fetch unit 110 and instruction decode unit 120 may be out of synchronization with pipeline 100. Additionally, BTB-top of stack pointer 170 and ID-top of stack pointer 171 may be no longer pointing to the proper entry in real return stack buffer/speculative return stack buffer 112. Thus, all entries in the speculative buffers at instruction fetch unit 110 and instruction decode unit 120 are marked invalid, and pointers BTB-top of stack pointer 170 and ID-top of stack pointer 171 are updated with more recent information.

In the exemplary embodiment of the present invention, a process similar to that illustrated in FIG. 5c is not performed when the pipeline switches from instruction fetch unit 110 as the source of instructions to trace cache unit 130. Since trace cache unit 130 is downstream in the pipeline from instruction fetch unit 110, trace cache unit 130 detects instructions provided to pipeline 100 by instruction fetch unit 110 via snooping path 132. Thus, trace cache unit 130 always has current information.

Referring now to the flowchart of FIG. 6a, a flowchart of a process performed by trace branch information table 135 is illustrated in connection with maintaining pointers to real return stack buffer/speculative return stack buffer 122 in a pipeline where instruction are executed in an out-of-order sequence. Trace branch information table 135 snoops instruction path 132 (step 610) and detects micro-op instructions (step 615). If a detected micro-op is a branch instruction associated with a CALL instruction (step 620), TBIT-top of stack pointer 173 is incremented (step 625). If the detected micro-op is, instead, a branch instruction associated with a RETURN FROM SUBROUTINE instruction (step 630), TBIT-top of stack pointer 172 is decremented (step 635). (If the instructions is not a branch instruction associated with a CALL instruction nor a RETURN FROM SUBROUTINE instruction, TBIT-top of stack pointer 172 is not changed.)

For each micro-op detected, trace branch information table 135 stores in a table entry the allocated sequence number of the micro-op, and the current value of TBIT-top of stack pointer 172 (step 640), trace branch information table 135 then continues to snoop instruction path 132 (step 610).

FIG. 6b illustrates the process performed in instruction pipeline 100 in the event that a branch misprediction is detected by execution unit 150. In particular, execution unit 150 first transmits the sequence number of the branch instruction to trace branch information table 135 (step 650). Using the sequence number, trace branch information table 135 looks up an entry in its table to retrieve a TBIT-top of stack pointer value (step 655). The TBIT-top of stack pointer portion of the entry is then copied to TBIT-top of stack pointer 173 (step 660). Next, TBIT-top of stack pointer 173 is copied to TBTB-top of stack pointer 172, ID-top of stack pointer 171, and BTB-top of stack pointer 170, thereby restoring the state of the machine with respect to real return stack buffer/speculative return stack buffer 122 (step 665). All stack entries in each of the speculative stacks, i.e., speculative return stack buffer 114, speculative return stack buffer 121 and speculative return stack buffer 124, are then marked invalid (step 670). Finally, pipeline 100 is restarted at instruction fetch unit 110 (including. for example, flushing pipeline 100).

Figure 7A:
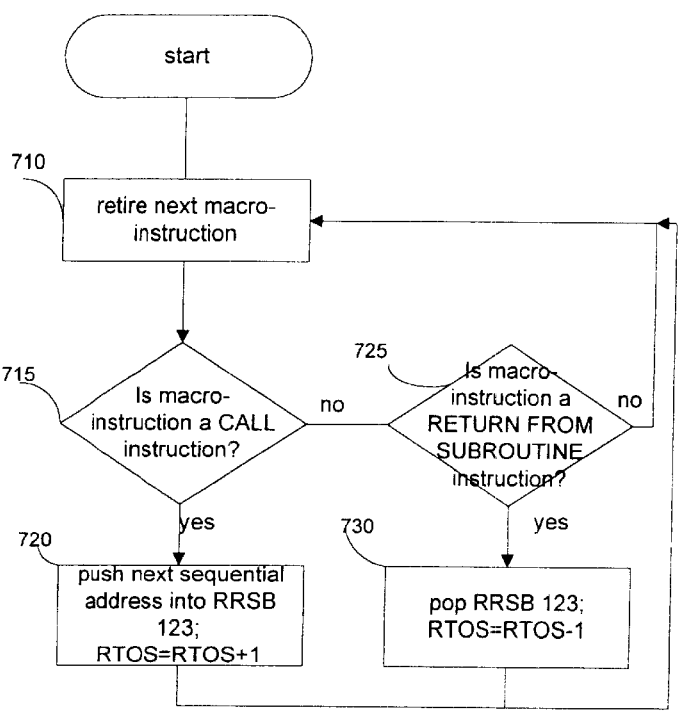
FIG. 7a is a flowchart of an exemplary process performed by a write back unit in connection with maintaining a real return stack buffer.
Figure 7B:
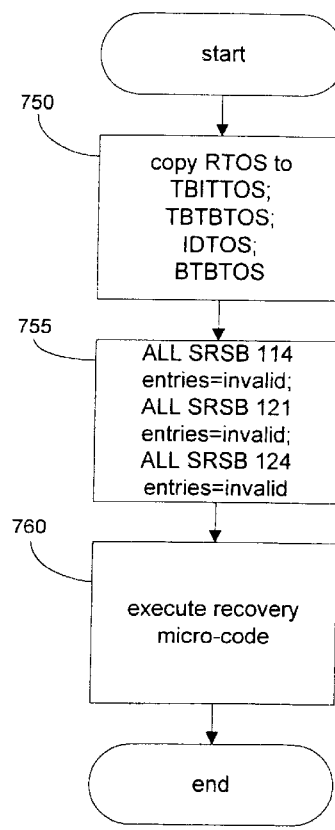
FIG. 7b is a flowchart of a process for recovering from EVENTs and TRAPs performed in the exemplary pipeline.

FIGS. 7a and 7b illustrate processes performed by write back unit 160 with respect to maintaining and synchronizing pointers to return stack buffers. Referring first to FIG. 7a, write back unit 160 first retires a macro-code (step 710). If the macro-code instruction is a CALL instruction (step 715), write back unit 160 pushes the address of the next sequential instruction into real return stack buffer 123 and increments R-top of stack pointer 174 (step 720).

If, instead, the macro-code instruction is a RETURN FROM SUBROUTINE instruction (step 725), write back unit 160 pops an address from real return stack buffer 123 (write back unit 160 does not use this address), and decrements R-top of stack pointer 174 (step 730).

The microprocessor detects certain conditions, such as EVENTs and TRAPs, which cause the microprocessor to execute machine micro-code. (EVENTs and TRAPs are conditions which are outside the scope of this discussion). If write back unit 160 detects an EVENT or a TRAP condition, the process of FIG. 7b is preformed. In particular, R-top of stack pointer 174 is copied to TBIT-top of stack pointer 173, TBTB-top of stack pointer 172, ID-top of stack pointer 171 and BTB-top of stack pointer 170 (step 750). All entries in all speculative return buffers are then invalidated. That is, each entry in speculative return stack buffer 114, speculative return stack buffer 121, and speculative return stack buffer 124 are marked invalid (step 755). The processor then executes recovery micro-code (step 760).

OTHER EMBODIMENTS

While the present invention has been particularly shown and described with reference to an exemplary embodiment thereof, it will be understood by those skilled in the art that various changes in form and details may be made therein without departing from the spirit and scope of the invention.

What is claimed is:

1. An instruction pipeline in a microprocessor, comprising:
   a plurality of pipeline units, each of the plurality of pipeline units processing a plurality of instructions, at least two of the pipeline units being a source of at least some of the plurality of instructions for the instruction pipeline; and at least two speculative return address stacks, each of the speculative return address stacks coupled to a respective one of the at least two pipeline units, each of the speculative return address stacks capable of storing at least two speculative return addresses.

2. The instruction pipeline of claim 1, further comprising:

a real return address stack, the real return address stack coupled to at least one of the plurality of pipeline units, the real return address stack for storing a real return address.

3. The instruction pipeline of claim 1, wherein at least one of the pipeline units processes at least some of the plurality of instructions in an out-of-order sequence.

4. The instruction pipeline of claim 1, wherein at least one of the plurality of pipeline units includes branch prediction circuitry.

5. The instruction pipeline of claim 1, wherein at least two of the plurality of pipeline units includes branch prediction circuitry.

6. The instruction pipeline of claim 1, wherein a first one of the at least two of the plurality of pipeline units supplies instructions to the instruction pipeline during a first time, and a second one of the at least two of the plurality of pipeline units supplies instructions to the instruction pipeline during a second time, the second time being outside the first time.

7. An instruction pipeline in a microprocessor, comprising:

a plurality of pipeline units, each of the plurality of pipeline units processing a plurality of instructions, at least two of the pipeline units being capable of recognizing a subroutine CALL instruction; and a plurality of speculative return address stacks, each respective one of the at least two pipeline units coupled to a respective one of the speculative return address stacks and storing a speculative return address as a function of the recognized subroutine CALL instruction in the respective one of the speculative return address stacks.

8. The instruction pipeline of claim 7, further comprising:

a real return address stack, the real return address stack coupled to at least one of the at least two pipeline units, the real return address stack for storing a real return address as a function of the recognized subroutine call instruction.

9. The instruction pipeline of claim 8, wherein the plurality of pipeline units includes an instruction fetch unit for fetching at least a subset of the plurality of instructions, and a decode unit for decoding each of the fetched instructions into at least one micro-code instruction, and wherein the instruction pipeline further includes a table for storing for each of the at least one micro-code instruction a pointer to the real return address stack.

10. The instruction pipeline of claim 9, wherein a subset of the plurality of pipeline units maintains a respective pointer into the real return address stack.

11. The instruction pipeline of claim 7, wherein each respective one of the at least two pipeline units pushes a return address onto the respective speculative return address stacks upon recognizing the subroutine CALL instruction.

12. The instruction pipeline of claim 11, wherein each of the at least two pipeline units are capable of recognizing a return from subroutine instruction, and wherein each of the at least two pipeline units pops the return address from at least one of the plurality of speculative return address stacks upon recognizing the return from subroutine instruction.

13. The instruction pipeline of claim 7, wherein at least two of the plurality of pipeline units includes branch prediction circuitry.

14. The instruction pipeline of claim 7, wherein a first one of the plurality of pipeline units supplies instructions to the instruction pipeline during a first time, and a second one of the plurality of pipeline units supplies instructions to the instruction pipeline during a second time, the second time being outside the first time.

15. An instruction pipeline in a microprocessor, comprising:

a plurality of pipeline units, each of the plurality of pipeline units processing a plurality of instructions, at least two of the pipeline units fetching at least some of the plurality of instructions from memory and providing the fetched instructions to the instruction pipeline; and at least two speculative return address stacks, each of the speculative return address stacks coupled to a respective one of the at least two pipeline units, each of the speculative return address stacks capable of storing at least two speculative return addresses.

16. The instruction pipeline according to claim 1, wherein each of the at least two pipeline units includes respective branch prediction circuitry.

* * * * *